3,804,804
PREPARATION OF HETEROCYCLIC POLYMERS FROM HETEROAROMATIC TETRAMINES
Arthur H. Gerber, University Heights, and Stanley D. Koch, Beachwood, Ohio, assignors to Horizons Incorporated, a Division of Horizons Research Incorporated
No Drawing. Continuation-in-part of application Ser. No. 92,154, Nov. 23, 1970, now Patent No. 3,740,410. This application June 9, 1971, Ser. No. 151,601
Int. Cl. C08g 20/32, 33/02
U.S. Cl. 260—47 CP                  25 Claims

ABSTRACT OF THE DISCLOSURE

A process for the preparation of uncyclized and cyclized heterocyclic polymers which comprises the reaction of heteroaromatic tetramines or their acid salts with a polybasic acid, acid derivatives, or a bis($\alpha$-dicarbonyl) compound. Said heteroaromatic tetramines are derived from a diamino heteroaromatic by a process which involves at least a nitration and reduction reaction.

---

This application is a continuation-in-part application of Ser. No. 92,154 filed Nov. 23, 1970, which issued as U.S. Pat. 3,740,410 on June 19, 1973.

This invention relates to a novel process for preparing linear high molecular weight condensation polymers under very mild reaction conditions. Such polymers are characterized by possessing solubility in both acidic and nonacidic solvents, and the capacity upon heating to form relatively intractable materials with outstanding thermal, chemical, and radiation resistance, useful for the fabrication of coatings, films, fibers, composites, and the like. However, the unusual physical and chemical properties of these polymers in their less tractable form present significant difficulties in shaping the polymers into useful forms. One purpose of this invention is to provide a simple process for the preparation of various classes of linear heterocyclic aromatic polymers which can be easily processed to useful shapes and structures and subsequently converted to the relatively intractable materials with outstanding properties.

A further object of this invention is to describe a novel aromatic tetramine which is useful in the above processes, for dyestuffs, and for hair dyeing.

Still another object of this invention is to provide novel compositions, both in tractable and essentially intractable form by reaction of novel aromatic tetramines using the processes hereinafter described.

Still another object is to provide the dinitroamine which is the precursor of the novel aromatic tetramines.

In the art of preparing thermally stable heterocyclic polymers an aromatic tetramine of the bis-ortho or bis-peri diamine type is often an essential reactant. Some of the polymers that can be prepared from such tetramines include polybenzimidazoles, polyimidazopyrrolones, polybenzimidazobenzophenanthrolines, polyquinoxalines and poly(imidazopyrroloneimidazoles). The present invention provides means for the production of such polymers, but the invention is not necessarily restricted to the named classes.

It also is known that many such tetramines are exceedingly susceptible to oxidative degradation. Such degradation in the course of initiating or carrying out the polymerization results in undesirable color formation as well as in the destruction of some amine functionality which, in turn, upsets reactant stoichiometry resulting in lower molecular weight polymer with undue color. This greatly limits the use of such compositions.

Useful, tractable linear polymers or prepolymers can be prepared under mild reaction conditions in only very limited instances, including reaction of dianhydrides with aromatic tetramines in polar solvents and by reaction of bis($\alpha$-dicarbonyl) compounds. Use of the very reactive acid halides for the preparation of such polymers has not been found to be practical by the previously known art because undesirable compositions result, either as very low molecular weight or gelled polymeric material.

The major object of this invention, provision of a simple polymerization process effected under mild reaction conditions using a relatively stable source of tetramine monomer, is accomplished in accordance with the invention, by reacting a tetramine acid salt, generally the hydrochloride, with either a diacid chloride, a monoacid chloride anhydride of a tribasic acid, a dianhydride of a tetrabasic acid, or a bis($\alpha$-dicarbonyl) aromatic compound without neutralizing the amine salt prior to the polymerization proper which may be carried out at temperatures from below 0° C. up to about 100° C. The first three of the aforementioned acid derivatives can be present simultaneously providing that the total number of moles of acid reactants substantially equals the moles of tetramine reactant. In this manner random copolymers and block copolymers can be prepared, many of which have unexpected desirable properties, particularly relating to solubility and processability. It has been found unexpectedly that the structure of the tetramine is extremely critical to the above polymerization processes.

The requisite tetramine structure contains one heterocyclic nucleus or more than one heterocyclic nuclei either fused or separated from one another by a single bond or functional group such as ether oxygen, carbonyl, or methylene. These tetramine bases have the general formula: $R_1(NH_2)_4$ in which $R_1$ is a tetravalent organic aromatic radical selected from the group consisting of:

6-membered rings containing one nitrogen atom in the ring;
di(heteroaryl) rings in which the rings are separated by up to one atom (0 or 1) and each ring contains one ring nitrogen.

The four amine substituents are arranged in pairs, the amine groups in each pair being ortho to each other, but in no case are three amine substituents substituted in consecutive, adjacent positions on the same ring.

Representative of the aromatic tetramines whose acid salts have been used for this invention include the following:

2,3,5,6-tetraaminopyridine and
4,4',5,5'-tetraamino-2,2'-bipyridine

The heteroaromatic tetramines of the invention have not been previously reported in the literature, with the exception of 4,4',5,5'-tetraamino-2,2'-bipyridine reported in French Pat. 1,115,607, and hence the polymers derived from these tetramines are novel compositions.

Since the tetramines of the invention possess fewer ring protons than their corresponding benzenoid analogs the resulting polymers have frequently been demonstrated to have increased thermal stability and resistance to oxidation.

The particular acid used or the amount of acid is often important in achieving the desired result. This effect is manifested in several ways. For example, the hydrobromide, trifluoroacetate, or lower alkanesulfonate salts, including perfluoroalkanesulfonate salts, are more soluble than the corresponding hydrochloride salts in the preferred solvents for the polymerizations. In addition, the presence of excess acid, similar or dissimilar to that already present in the amine salt, can preserve light color by minimizing oxidative degradation and favors controlled, as opposed to random, reaction of the carboxylic acid reactant with the tetramine salt. Presumably this is possible because the excess acid decreases the equilibrium concentration of free amino groups. In so doing, gelation is avoided and the probability of formation of desired structure is increased.

The addition of a dissimilar acid to a hydrochloride salt, for example methanesulfonic or benzenesulfonic acid which are stronger acids than hydrogen chloride, leads to in situ formation, at least in equilibrium concentrations, of amine sulfonate salts which lead to the above effects but avoid the direct preparation and isolation of the sulfonate salt.

Often, in order to moderate a reaction with a very active acid derivative or bis(α-dicarbonyl) compound at a given temperature, the trifluoromethanesulfonic acid (TMSA) salt, or preferably a triacid salt containing one equivalent of TMSA, can be used. For example, addition of one equivalent of TMSA to one mole of 2,3,5,6-tetraaminopyridine trihydrochloride forms in situ the mono-TMSA-dihydrochloride salt of 2,3,5,6-tetraaminopyridine. This moderation of reactivity based on acid-base interaction can be particularly advantageous in further ensuring that a polymer more closely approaching the idealized prepolymer structure is obtained. Presumably protonation by the very strong TMSA decreases the activity of α- and γ-amino groups. In the case of di-heteroaryl tetramines similar moderation can be achieved by using one equivalent of TMSA per heterocyclic ring bearing an ortho pair of amine groups. When TMSA is so used it is not always necessary to add additional acid (hydrogen chloride, methanesulfonic acid, etc.) to ensure complete protonation of other amine sites.

Furthermore, the use of methanesulfonic acid and trifluoromethanesulfonic acid salts often yields polymer solutions which are dilutable with low-boiling solvents, such as methanol. Such diluted solutions are useful in that they possess low viscosity thus making them ideally suited for coating applications.

One of the unique advantages of using salts of the aromatic heterocyclic tetramines of the present invention instead of presently available aromatic carbocyclic tetramines for the preparation of cyclized polyheterocyclic condensation polymers such as polybenzimidazoles is that tractable, linear, relatively uncyclized prepolymers can be formed with ease at room temperature with less concern for the mode of addition, and with excellent color and stoichiometry.

Reaction of conventional tetramine salts such as 1,2,4,5-tetraaminobenzene tetrahydrochloride and 3,3′-diaminobenzidine dihydrochloride with a diacid chloride such as isophthaloyl chloride results in gelation regardless of whether the amine salt is added to a solution of the chloride or a solution of chloride is added to a solvent mixture of the amine salt. It has now been unexpectedly found that the acid salts (e.g. polyhydrochlorides) of tetramine monomers of the type described in this specification, such as 2,3,5,6-tetraaminopyridine, can be reacted, under controlled conditions, without development of significant gelation, with isophthaloyl chloride regardless of the order of addition of the reactants.

Tractable, linear, polymeric precursors to polybenzimidazoles are formed by reaction of suitable tetramine salts with substantially the stoichiometric amount of bis-(acid halide). The latter is preferably the acid chloride, but the acid bromide is also useful. The chlorides are preferred since some are readily available and since they are usually more stable than the corresponding bromide. Suitable acid halides include those derived from the following dibasic acids:

isophthalic
terephthalic
2,6-naphthalenedicarboxylic
3,5-pyridinedicarboxylic
2,7-anthraquinonedicarboxylic
4,4′-biphenyldicarboxylic
bis(4-carboxyphenyl) ether
bis(4-carboxyphenyl) ketone
bis(4-carboxyphenyl) sulfone Under the mild reaction conditions of this invention (temperatures ranging from below 0° C. to about 75° C.) the free carboxylic acid or its dimethyl or diphenyl esters are unsuitable since little or no reaction occurs at these temperatures with a tetramine acid salt.

Preparation of prepolymers (i.e., non-cyclodehydrated analogs) of polybenzimidazobenzophenanthrolines, polyimidazopyrrolones and the like by reaction of the hydrochloride salts with dianhydrides is considerably slower than the corresponding reaction with acid halides. Nevertheless, rapid reaction can occur at ambient temperatures in many instances. Maximum temperatures to about 100° C. may sometimes be employed. Suitable dianhydrides include the following:

pyromellitic dianhydride
2,3,6,7-naphthalenetetracarboxylic dianhydride
3,3′,4,4′-diphenyltetracarboxylic dianhydride
1,2,5,6-naphthalenetetracarboxylic dianhydride
2,2′,3,3′-diphenyltetracarboxylic dianhydride
2,2-bis(3,4-dicarboxyphenyl)propane dianhydride
bis(3,4-dicarboxyphenyl) sulfone dianhydride
3,4,9,10-perylenetetracarboxylic dianhydride
bis(3,4-dicarboxyphenyl) ether dianhydride
naphthalene-1,2,4,5-tetracarboxylic dianhydride
naphthalene-1,4,5,8-tetracarboxylic dianhydride
decahydronaphthalene-1,4,5,8-tetracarboxylic dianhydride
2,6-dichloronaphthalene-1,4,5,8-tetracarboxylic dianhydride
2,7-dichloronaphthalene-1,4,5,8-tetracarboxylic dianhydride
2,3,6,7-tetrachloronaphthalene-1,4,5,8-tetracarboxylic dianhydride
phenanthrene-1,8,9,10-tetracarboxylic dianhydride
cyclopentane-1,2,3,4-tetracarboxylic dianhydride
pyrazine-2,3,5,6-tetracarboxylic dianhydride
2,2-bis(2,3-dicarboxyphenyl)propane dianhydride
1,1-bis(2,3-dicarboxyphenyl)ethane dianhydride
1,1-bis(3,4-dicarboxyphenyl)ethane dianhydride
bis(2,3-dicarboxyphenyl)methane dianhydride
bis(3,4-dicarboxyphenyl)methane dianhydride
benzene-1,2,3,4-tetracarboxylic dianhydride
thiophene-2,3,4,5-tetracarboxylic dianhydride
decahydronaphthalene-1,2,5,6-tetracarboxylic dianhydride
cyclohexane-1,2,4,5-tetracarboxylic dianhydride
3,3′,4,4′-benzophenonetetracarboxylic dianhydride
pyridine-2,3,5,6-tetracarboxylic dianhydride
anthraquinone-2,3,5,6-tetracarboxylic dianhydride Other dianhydrides and mixtures of dianhydrides may be used as will be seen from the examples which follow.

Polymers prepared by reaction of aromatic tetramine acid salts with dianhydrides are known, but these materials are generally prepared by reaction of the very unstable tetramine free base which is used as is or generated in situ by addition of an acid acceptor, generally a tertiary amine (e.g. pyridine, triethylamine), with the consequent formation of the tertiary amine salt which is not easily volatilized and must be subsequently washed out in order to achieve optimum material and performance.

Thus another advantage of the present invention is that the relatively stable tetramine salts, which can be obtained in high purity and light color, can be used directly as salts for the polymerization process.

The reaction of the heterocyclic tetramine salts of this invention with substantially equimolar amounts of the mono-acid chloride anhydrides of tribasic acids to give soluble polyamide prepolymers with an average of one unreacted carboxyl group per mole of tricarboxylic acid derivative and an average of two unreacted primary amine groups per mole of tetramine salt is an extension of the previously discussed diacid chloride and dianhydride reactions. Suitable acid chloride anhydrides include those derived from the following tribasic acids:

1,2,4-benzenetricarboxylic acid
1,4,5-naphthalenetricarboxylic acid
2,3,6-anthraquinonetricarboxylic acid
2,3,6-naphthalenetricarboxylic acid
3,3',4-tricarboxybiphenyl
3,4-dicarboxyphenyl 4'-carboxyphenyl ether
3,4-dicarboxyphenyl 3'-carboxyphenyl sulfone
3,3',4-tricarboxybenzophenone
2,3,6-pyridinetricarboxylic acid
2,3,5-thiophenetricarboxylic acid
2,3,8-dibenzofurantricarboxylic acid
1,2,4-cyclohexanetricarboxylic acid Additional polymers can be derived by reaction of the acid salts of the heterocyclic tetramines of this invention with bis ($\alpha$-dicarbonyl) aromatics, specifically bis-glyoxals and bis-benzils. Again the davantage of this process is that the free tetramine base need not be isolated. Suitable bis ($\alpha$-dicarbonyl) compounds that have been used include the following:

1,3-diglyoxaloylbenzene
1,4-diglyoxaloylbenzene
4,4'-diglyoxaloyldiphenyl sulfide
4,4'-diglyoxaloyldiphenyl sulfone
4,4'-diglyoxaloyldiphenyl
4,4'-diglyoxaloylbenzophenone
2,6-diglyoxaloylnaphthalene
2,8-diglyoxaloyldibenzofuran
bis(5-glyoxaloyl-2-pyridyl) ether
1,3-bis(phenylglyoxaloyl)benzene
1,4-bis(phenylglyoxaloyl)benzene
4,4'-bis(phenylglyoxaloyl)diphenyl
bis[4-(phenylglyoxaloyl)phenyl] ether
bis[4-(phenylglyoxaloyl)phenyl] sulfone
4,4'-bis(phenylglyoxaloyl)benzophenone
pyrene-4,5,9,10-tetrone In addition to the aforementioned polymers derived from the derivatives of di-, tri- and tetrabasic acids, heterocyclic copolymers can also be easily prepared by the teachings of this invention by simply reacting one or more of the acid salts of the tetramines of the invention with at least two of the functionally different acid derivatives present simultaneously with the provision that the total moles of acid reactants substantially equal the moles of tetramine salt (or salts). Furthermore the reaction can be carried out in two or more stages as follows: The tetramine salt is pre-reacted with less than a molar quantity of acid reactant and then a different (similar of dissimilar acid type) acid reactant is added so that the total moles of acid reactants substantially equal the total moles of tetramine salt. For example, the hydrochloride salt of 2,3,5,6-tetraaminopyridine (0.05 mole) is reacted at ice temperature with a solution of isophthaloyl chloride (0.025 mole) in N-methylpyrrolidinone until the reaction is essentially complete. Pyromellitic dianhydride (0.025 mole) is added and the reaction gradually allowed to warm up to ambient temperature. The product so formed is a copolymer containing only polybenzimidazole and polyimidazopyrrolone prepolymer units. In similar manner random heteroaromatic polymers or ordered block copolymers can be produced. The advantage of such compositions is that they often possess desirable properties not shown by either parent homopolymer.

It is also possible to prepare copolymers derived from acid salts of more than one of the heterocyclic tetramines of this invention, or from a mixture of acid salts of at least one of the heterocyclic tetramines of this invention and at least one other aromatic tetramine (i.e. carbocyclic aromatic tetramines such as 3,3',4,4'-tetraaminobenzophenone and 3,3'-diaminobenzidine). It is possible to prepare copolymers derived from acid salts of mixed tetramines, as described above, and derivatives of at least two different di-, tri-, or tetracarboxylic acids. The advantages of both compositions just described is, again, that they often possess desirable properties, particularly in the fully cyclized form, not shown by the simpler homopolymers.

Interpolymerization of more than one tetramine with a given acid derivative or interpolymerization of one tetramine with more than one acid derivative have already been cited as possible methods of introducing favorable properties into the resultant heterocyclic polymers. Still another method of tailoring polymer properties involves copolymerization with an aromatic diamine, with the provision that the total moles of amines is essentially equal to or greater than the total moles of acid reactant or reactants. In so doing polymers may be obtained in which one or more of the following properties is increased: flexibility, elongation, solubility; all three of which can make for easier processability of the polymer into useful shapeable compositions, particularly films, fibers, and composite structures. In such a polycondensation the aromatic diamine can be used or the acid salt thereof. The following are representative of some of the diamines that can be so used.

2,4-diaminotoluene
m-phenylenediamine
p-phenylenediamine
1,5-naphthalenediamine
1,4-naphthalenediamine
2,5-furandiamine
2,4-thiophenediamine
3,5-diaminopyridine
(4-aminophenyl) ether
bis(4-aminophenyl) methane
2,2-bis(4-aminophenyl)propane
5-amino-2-(4-aminophenoxy)pyridine
4,4'-biphenyldiamine
3,8-dibenzofurandiamine
5,5'-diamino-2-pyridyl ether
4-phenoxy-m-phenylenediamine
3,3'-dimethylbenzidine
3,3'-dimethoxybenzidine
4,4'-diaminodiphenyl sulfide
2,7-fluorenediamine
4,4'-diaminobibenzyl
2-(2,4-diaminophenoxy)-pyridine Certain derivatives of many of the above diamines are also suitable. For example diamines which contain a hydroxyl or mercapto group ortho to one or both amine groups. Some representative hydroxy and mercapto containing diamines are:

4-hydroxy-m-phenylenediamine
4-mercapto-m-phenylenediamine
4,6-diaminoresorcinol
4,6-diamino-1,3-benzenedithiol
3,3'-dimercaptobenzidine
3,3'-diamino-p,p'-biphenol
4,4'-diamino-m,m'-biphenol
4,4'-diamino-3,3'-dimercapto-biphenyl
4,4'-diamino-3,3'-dihydroxydiphenylmethane
4,4'-diamino-3,3'-dimercaptodiphenylmethane Diamines that are not particularly preferred include the following:

2,6-diaminopyridine
2,5-diaminopyridine
(4-aminophenyl) sulfone
1,5-diaminoanthraquinone
4,4'-diamino-2,2'-bipyridine
6,6'-diamino-2,2'-bipyridine
2,6-diaminopyrazine By increasing the mole ratio of tetramine salt to acid derivative to greater than unity, amine-terminated prepolymers of lower molecular weight may be obtained. These polymers can then be used as reactants for the preparation of high molecular weight polymers which may contain monomer residues other than the two present in the original polymerization.

All of the aforementioned polymerizations are carried out in aprotic polar organic solvents which are at least in part solvents for at least one of the reactants and which, under the reaction conditions used, do not react with either of the reactants (excluding salt-formation) and which are preferably solvents for the desired polymer. Organic solvents of the N,N-dialkylcarboxamide class are useful solvents in the process of this invention. Preferred solvents of this class include N,N-dimethylformamide, N,N-dimethylacetamide, N-methylpyrrolidinone, and N-methylcaprolactam. Other solvents which can be used are: N,N-diethylformamide, N,N-dimethylmethoxyacetamide, hexamethylphosphoramide, dimethyl sulfoxide, dimethyl sulfone, tetramethylene sulfone, and tetramethyl urea.

The above solvents can be used singly or in combination or in combination with poorer solvents. In the case of the heterocyclic polymers derived from bis($\alpha$-dicarbonyl) aromatics, protic polar solvents such as acetic and propionic acids, trifluoroethanol, 2,2,3,3 - tetrafluoropropanol, hexafluoroisopropyl alcohol, and m-cresol may serve as cosolvents.

The conversion of soluble, uncyclized or relatively uncyclized polymers (prepolymers) to the cyclized, relatively intractable heterocyclic products is carried out by known methods. These methods consist of either heating the dry prepolymer under inert atmosphere or under vacuum at temperatures of 200–400° C. or of heating a solution of prepolymer in polyphosphoric acid at temperatures of 150–200° C. These cyclized polymers can also be prepared directly from tetramine, or tetramine salt, and acid reactant by methods well known in the art. The advantage of having a process for the preparation of soluble prepolymers relates to the vastly superior processability of prepolymers over their cyclized analogs making them more suitable for fiber, film, and molding manufacture.

Several routes may be employed to synthesize the novel heterocyclic tetramines including the following:

(1) Direct dinitration of diamines: The diamino material can be directly dinitrated to yield the $\alpha,\alpha'$-diamino-$\beta,\beta'$-dinitro-derivative which upon chemical or catalytic reduction yields the desired tetramine which is easily converted to an acid salt.

(2) Dinitration of amine derivatives: the $\alpha,\alpha'$-diamino derivative described above for direct dinitration of diamines is first reacted with one or two moles of an acid reactant selected from the group consisting of acetic anhydride, acetyl chloride, methyl chloroformate, ethyl chloroformate, trifluoroacetic anhydride, and methanesulfonyl chloride. The resulting amine derivative is then dinitrated and the resulting compound converted to the $\alpha,\alpha'$-diamino-$\beta,\beta'$-dinitroheterocycle by ammonolysis or by acid hydrolysis. Reduction then affords the tetramine or its acid salt.

The direct dinitration of diamines is a particularly desirable route because of the small number of reaction steps. By this route 2,3,5,6-tetraaminopyridine can be prepared in three clean steps from pyridine (the usual literature route requires four steps to convert benzene to 1,2,4,5-benzenetetramine).

The nitration of diamino heteroaromatic compounds to the corresponding diamino dinitro compounds represented in Formula I, is described in copending patent application Ser. No. 97,419, filed Dec. 30, 1970. Both 2,6-diaminopyridine and 2,6-bis(acetamido)pyridine are easily converted to 2,6-diamino-3,5-dinitropyridine by the teachings of this application.

The compound 2,6-diamino-3,5-dinitropyridine is preferably prepared by direct nitration of 2 6-diaminopyridine. This is in marked contrast to the preparation of the appropriate diaminodinitrobenzene precursors to 1,2,4,5-benzenetetramine which cannot be conveniently prepared in pure form directly from a phenylenediamine.

2,6-diamino-3,5-dinitropyridine can also be prepared from a derivative of 2,6-diaminopyridine by nitration with subsequent hydrolysis. Suitable derivatives of the 2,6-diaminopyridine can be obtained by acetylation, p-nitrobenzoylation, sulfonamide-, or urethane-formation of 2,6-diaminopyridine.

Acylated or sulfonated compounds represented by Formula I can be converted to the corresponding heteroaromatic tetramines of formula $R_1(NH_2)_4$ by reaction with ammonia or an ammonia source or with hot, aqueous acid followed by hydrogenation. The former method is preferred with mononuclear compounds when $R_2$ and $R_3$ are selected from

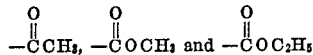

Ammonolysis of the sulfonate or trifluoroacetate derivatives of mononuclear compounds is not desirable, hence acidic hydrolysis is the method of choice for those derivatives.

Nitration of bis(acylated or sulfonated) 2,6-diaminopyridine, and its bicyclic and tricyclic is considerably slower where the aimnes are substituted with —$SO_2CH_3$ or —$COCF_3$ than the case where the two amines are unsubstituted. Nitration of amine groups substituted with —$COOC_2H_5$ is intermediate in rate. Essentially the same nitration procedure is employed for these less reactive substituents except that higher final temperatures are used, preferably 40–80° C.

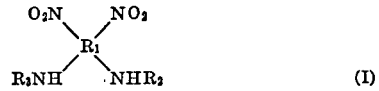

wherein each $R_2$ and $R_3$ is selected from the group consisting of

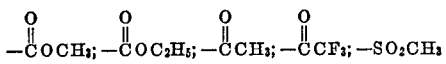

and wherein $R_1$ is a tetravalent organic aromatic radical selected from the group consisting of 6-membered rings containing one nitrogen atom in the ring, and di-heteroaryl rings wherein the rings are separated by not more than one atom (0 or 1) and each ring contains one ring nitrogen; the relationship of each nitro group and amine or amine derivative being such that each nitro group is ortho to an amine group or amine derivative; in no case shall three nitrogen functions, such as nitro group, amine group, and amine derivative, be substituted in three consecutive, adjacent positions on the same ring; and in no case shall two nitro groups be ortho or para to each other on the same ring.

Although it is not readily apparent, there are often some advantages in using the acid derivatives of the diamine as a precursor to tetramine. The nitration is often cleaner on the blocked amine rather than the free amine, and the conversion of the amine derivative of the diamino-dinitroheterocycle to the diamino-dinitro analog is often accomplished in excellent yield to give material of high purity directly suitable for subsequent reduction to the desired tetramine. On the other hand, direct nitration of a diamine heterocycle, in particular pyridine usually afford product which must be rigorously purified so that the subsequent reduction yields high purity, light colored tetramine product.

Regardless of which route is taken to prepare the diamino-dinitroheterocycles the reduction to tetramine may be carried out either chemically or catalytically by methods well established in the art. The reduction can be carried out chemically by methods well known in the art or catalytically as described for the preparation of 2,3,5,6-tetraaminopyridine, and salts thereof, from 2,6-diamino-3,5-dinitropyridine in copending patent application Ser. No. 97,419, filed Dec. 30, 1970. Since chemical reducing agents often lead to contamination of product, the catalytic method is preferred. A preferred embodiment of this method involves using a mixed solvent comprising an acid selected from the group consisting of sulfuric acid, hydrogen bromide, trifluoroacetic acid, phosphoric acid, lower alkanesulfonic acids and perfluoroalkanesulfonic acids together with a hydroxyl-containing compound selected from the group consisting of water, lower alkanols (including fluoro and alkoxy alkanols) and lower carboxylic acids. Where very strong acids are used, lower concentrations of said acid may be employed in the solvent composition.

If a non-acidic solvent is used for the reduction, the tetramine free base can be isolated directly. Organic amines such as pyridine are particularly useful when used as sole solvent or in conjunction with other non-acidic solvents. Their use leads to an unexpected large increase in reduction rate, thus permitting significantly shorter reaction times under a given set of conditions.

2,3,5,6-tetraaminopyridine free base is very susceptible to oxidation and is preferably prepared and used as its acid salts. Preferred acids for converting the free base to its salt include hydrochloric, hydrobromic, sulfuric, trifluoroacetic, trichloroacetic, methanesulfonic acid, ethanesulfonic acid, and trifluoromethanesulfonic acid, but many other acids are suitable. The hydrobromide, trifluoroacetate and alkanesulfonate salts are often desirable for polymerization reactions because of their greater solubility relative to the corresponding hydrochloride salts.

The preferred method for preparing the tetramine salts is not by direct neutralization of the free base, but rather by reduction of the dinitro precursor in an acidic solvent with subsequent isolation of the amine salt.

When acidic solvents are so used, the tetramine acid salt can be isolated conveniently either admixed with catalyst or as a solution which can then be precipitated by addition of the appropriate acid and/or nonsolvent.

The hydrochloride salt can also be used to prepare other acid salts. For example, a hydrochloride salt can be dissolved in methanesulfonic acid and the hydrogen chloride expelled from the resulting solution. Subsequent addition of nonsolvent causes the methanesulfonate salt to be precipitated.

Since the color and purity of the tetraaminoheterocycle are often extremely important, particularly in polymer-forming applications, the catalytic method of reduction in acidic media is advantageous in that high purity, light colored (white to off-white) acid salt of the tetraaminoheterocycle can be directly obtained in good yield.

The unique and unexpected behavior of the $\alpha,\alpha,'\beta,\beta'$-tetraaminoheterocycles so produced is typified by 2,3,5,6-tetraaminopyridine which forms a stable whitish trihydrocholride salt from an excess of hydrochloric acid. This material can form a diacetyl or tetraacetyl monohydrochloride derivative by reaction with two or four moles of acetylating reagent, respectively. This diacetyl derivative differs from the diacetylated product obtained from Compound I after reduction of nitro groups to amines, where $R_2$ and $R_3$ are acetyl. In the latter instance a diacetylated trihydrochloride compound results.

It can be concluded from the above experiments and other literature data, for example, protonation of $\alpha$- and $\beta$-aminopyridines, that there is a marked difference in reactivity between the $\alpha$- and $\beta$-amino groups of the heteroaromatic tetramines. A similar reactivity difference exists between the $\beta$- and $\gamma$-amino groups. It is believed that this differential reactivity gives the heteroaromatic tetramines of this invention their unique advantage over conventional carbocyclic tetramines as precursors for fused ring polymers.

When the acid salt of the tetramine is derived from a volatile acid, such as hydrochloric, hydrobromic, or trifluoroacetic, the polyheterocycles produced from reaction with di, tri-, or tetrabasic acid derivatives can be used directly to form films, coatings, and the like, which, upon the loss of solvent can be thermally converted to the less tractable cyclized polymer. Fibers may be produced by wet spinning the polymer solution into an aqueous system containing sufficient base to neutralize the strong acid.

In summary, the present invention provides a clean, simple synthesis for a family of nitrogen heterocyclic aromatic tetramines hitherto unknown and accessible only with difficulty, and shows how they can be converted to superior cyclized condensation polymers with aromatic oligoacids or bis($\alpha$-dicarbonyl) compounds. In contrast to the analogous polymers prepared from the carbocyclic aromatic tetramines known to the previous art, the polymers of this invention are easier to prepare in high purity and good color. The condensed polymers of this invention have better strength and less weight loss at temperatures of 400 to 650° C. than those derived from the analogous carbocyclic tetramines because the tetramine does not have a pair of vulnerable protons para to each other, and because they can be prepared from a linear, soluble prepolymer which has lighter color and better stoichiometry. These superiorities of the prepolymer arise because it can be prepared from the relatively oxidation-resistant amine salt, rather than from the sensitive free base. The nitrogen heterocyclic aromatic tetramines of this invention lead to linear, soluble prepolymers of very low color and excellent stoichiometry, prepared essentially without gelation by a simple process in organic solvents, in some polymer systems where such soluble prepolymers have hitherto been unobtainable.

Related subject matter is disclosed in two patent applications entitled, "2,3,5,6 - Tetraaminopyridine, 2,6-Diamino - 3,5 - Dinitropyridines, and their Amine Derivatives and Polymers Derived from Said Compounds," filed as Ser. No. 92,154 on Nov. 23, 1970, and as Ser. No. 97,419 on Dec. 30, 1970, the disclosures of which are incorporated in this application by reference.

The following examples are illustrative of preferred embodiments of this invention and are not to be construed as limiting the invention in any way.

EXAMPLE 1

Preparation of 2,6-diamino-3,5-dinitropyridine from 2,6-diaminopyridine

To 250 cc. of concentrated sulfuric acid was added, with chilling and stirring, 54.5 g. (0.5 mole or 1.0 equiv.) of 2,6-diaminopyridine, so that the temperature never rose above 25° C. A solution of 30 cc. sulfuric acid and 76 g. nitric acid [prepared from 47 cc. (75 g.) red fuming nitric acid and 12.9 cc. (18.3 g.) 70% nitric acid] was added to this solution over a two hour period so that the temperature was maintained at 10±5° C. The resulting dark solution was heated to 70° C. over ¾ hour and maintained at 70° C. for ½ hour. The reaction mixture was cooled and poured into 1.5 liter water, stirred well, and filtered. The solid product was washed well and dried to give 63 g. (63% yield). Elemental analysis is confirmatory. Calculated for $C_5H_5N_5O_4$: C, 30.2; H, 2.5; O, 32.2. Found: 31.7; H, 2.5; O, 32.3. Major peaks appear in the infrared (KBr) at about 2.9, 3.0, 6.2, 6.9, 7.3, 7.5, 7.8, 8.1, 9.6, 13.2 and 14.0$\mu$. Purified product is a golden yellow solid which sinters at about 300° C. and then decomposes at about 355° C.

EXAMPLE 2

Diethyl 2,6-pyridinedicarbamate

Ethyl chloroformate (171 cc., 195 g. or 1.8 mole) was gradually added to a well stirred mixture of 81.7 g. (0.75 mole=1.5 equiv.) 2,6-diaminopyridine, 207 g. (1.5 mole) anhydrous potassium carbonate, and 450 cc. tetrahydrofuran:N,N-dimethylformamide 5:2 v./v. Temperature during addition was 22–40° C. An adidtional 69 g. carbonate and 50 cc. chloroformate were added and the temperature maintained at 45–50° C. for 1 hour, during which significant carbon dioxide evolution occurred. The mixture was poured into 1 liter of cold water, and then 150 cc. conc. hydrochloric acid added, and the tetrahydrofuran allowed to evaporate from an open dish overnight. Most of the aqua-colored solid present was separated by decantation. The liquor was acidified with hydrochloric acid to pH 7, concentrated to about half volume, and cooled. Product and salts were filtered off and reslurried twice with water and filtered to remove most of the potassium chloride. The product was extracted from residual inorganic salts with 500 cc. of hot acetone. The product was reprecipitated on addition of 750 cc. of water, combined with previously removed colored solid, and slurried with isopropyl alcohol, filtered, and dried to give 42 g. (22%) light aqua solid, M.P. 124–128° C. Recrystallization from 1:1 v./v. ethanol-water raised the M.P. to 130–132° C.

Analysis, calcd. for $C_{11}H_{15}N_3O_4$ (mol. wt. 253): C, 52.2; H, 5.9; N, 16.6. Found: C, 51.6; H, 5.8; N, 16.5.

The above product can also be obtained in tetrahydrofuran solvent using a tertiary amine (e.g., pyridine, triethylamine) as acid acceptor. Dimethyl 2,6-pyridinedicarbamate is obtained by the use of methyl chloroformate in place of the ethyl chloroformate.

EXAMPLE 3

Diethyl ester of 3,5-dinitro-2,6-pyridinedicarbamic acid, (I) in which both $R_2$ and $R_3$ are

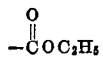

To a solution of 25.3 g. (0.1 mole) diethyl 2,6-pyridinedicarbamate in 125 cc. conc. sulfuric acid at 0–5° C. was added, over 1 hour, a solution of 100% nitric acid (0.4 mole or 100% excess) in acetic acid. The nitrating solution was prepared by gradually adding 14 cc. of acetic anhydride to 19 cc. of fuming 90% nitric acid while maintaining the temperature below 0° C. The nitration was completed by stirring 1 hour at 0–5° C. followed by 1 hour at 27° C. The reaction solution was poured into ½ liter cold water. The solid product was washed well and dried, yielding 25 g. of dried product. Recrystallization from ethanol gave 21.0 g. (62%), M.P. 160–164° C.

Dimethyl 2,6-pyridinedicarbamate can be similarly nitrated to give (I) in which both $R_2$ and $R_3$ are

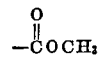

EXAMPLE 4

2,6-diamino-3,5-dinitropyridine

To a solution of 9.0 g. diethyl 3,5-dinitro-2,6-pyridinedicarbamate in 30 cc. N,N-dimethylformamide was added 10 cc. of conc. ammonia. Within about 5 minutes a massive precipitate formed. Stirring was continued overnight at room temperature. Isopropyl alcohol (50 cc.) was added with good stirring, the product filtered, washed, and dried to give 5.1 g. (97%) yellow solid. Infrared spectra showed no carbonyl absorption. Elemental analysis was as follows: Calcd. for $C_5H_5N_5O_4$: C, 30.1; H, 2.5; N, 35.1. Found: C, 30.6; H, 2.5; N, 35.7. The infrared spectrum of this product is essentially identical to that from Example 1.

In somewhat similar fashion 2,6-diamino-3,5-dinitropyridine may be obtained from substituted amines (I) in which $R_2$ and $R_3$ are each selected from the group consisting of —H,

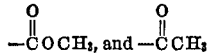

Compounds where $R_2$ is hydrogen and $R_3$ is not hydrogen are conveniently prepared by using a large excess of 2,6-diaminopyridine in the initial reaction with the anhydride or acid chloride.

EXAMPLE 5

2,6-diamino-3,5-dinitropyridine by acid hyrolysis

Diethyl 3,5-dinitro - 2,6 - pyridinedicarbamate (9.5 g.) was dissolved in 48 g. conc. sulfuric acid, 20 cc. water were added and the solution heated 4 hours at 110–115° C. The reaction mixture was cooled and poured into 250 cc. cold water with stirring. The solid precipitate was filtered, washed well, and dried to give a quantitative yield of 2,6-diamino-3,5-dinitropyridine.

EXAMPLE 6

Preparation of 3,5-dinitro-2,6-pyridinedimethanesulfonamide

To a well stirred solution at about —10° C., of 54.5 g. (0.5 mol=1.0 equiv.) of 2,6-diaminopyridine in 300 cc. pyridine was added 115 g. (1.0 mol) methanesulfonyl chloride. After ½ hour at this temperature, the dark solution was allowed to warm up to room temperature and kept at this temperature for 1½ hours. Product and hydrochloride salts were precipitated by addition of tetrahydrofuran and washing with tetrahydrofuran (total volume about 1 liter). The insoluble gum was diluted with 250 cc. water and neutralized with conc. ammonia. Water was largely removed from the mixture by rotary evacuation and the wet solid extracted with ½ liter of warm ethanol. The ethanolic liquor was concentrated to 200 cc., cooled to —20° C. and crude product (24 g.) filtered off. Removal of inorganic salt and recrystallization from aqueous ethanol gave 2,6-pyridinedimethanesulfonamide, M.P. 190–194° C. Elemental analysis, calculated for $$C_7H_{11}N_3O_4S_2$$

(M.W. 265); N, 15.9; S, 24.2. Found: N, 15.9, S, 23.9.

5.0 g. (0.019 mol) of the above 2,6-pyridinedimethanesulfonamide was dissolved in 20 cc. conc. sulfuric acid and a premixed solution of 4 cc. 90% nitric acid (100% mole excess) and 3 cc. acetic anhydride was added so that the reaction temperature was maintained in the range 20–28° C. The reaction was stirred at room temperature for 1 hour during which it became heterogeneous. Additional sulfuric acid (5 cc.) was added and the mixture heated at 50–55° C. 1 hour. After cooling to room temperature, it was poured with stirring on 53 g. ice. The yellow solid product was filtered, washed, reslurried with isopropyl alcohol, refiltered and dried to give 4.7 g. (70%), M.P. 275–285° C. This material was dissolved in 15 cc. N,N-dimethylacetamide at 80° C. and then boiling isopropyl alcohol added to initiate precipitation. The mixture was cooled to ice temperature, solid filtered off and dried to give 3.0 g., M.P. 282–286° C. Elemental analysis, calculated for $C_7H_9N_5O_8S_2$ (mol. wt. 355); N, 19.7; S, 18.0. Found: N, 19.4; S, 18.0.

EXAMPLE 7

The monomethanesulfonamide of 2,6-diaminopyridine was obtained in a reaction similar to that of Example 6 using excess 2,6-diaminopyridine (54.4 g.=1.0 equiv.), 100 cc. pyridine plus 200 cc. tetrahydrofuran as solvent, and 22.9 g. (0.2 mol) methanesulfonyl chloride. The product was isolated by removing tetrahydrofuran and pyridine, neutralizing the residue, and removing excess 2,6-diaminopyridine.

The above product upon reaction with ethyl chloroformate; or acetic anhydride (or acetyl chloride), and subsequent nitration afforded (I) in which $R_2$ is —$SO_2CH_3$ and $R_3$ is

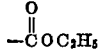

and in which $R_2$ is —$SO_2CH_3$ and $R_3$ is

respectively.

The dinitro product of this example and that of Example 6 were converted to 2,6-diamino-3,5-dinitropyridine in a manner similar to that described in Example 5.

EXAMPLE 8

Acid salts of 2,3,5,6-tetraaminopyridine (A) 2,3,5,6 - tetraaminopyridine bis(sulfuric acid salt): 2,6 - diamino - 3,5 - dinitropyridine (3.75 g. or 0.0188 mole) was partially dissolved in 60 cc. of 30% sulfuric acid in glacial acetic acid in a 250 cc. Parr bottle. It was stirred well with slight application of heat and 2.1 g. of 5% palladium on barium sulfate added. Reduction with hydrogen was complete (uptake of 9.0 p.s.i. hydrogen, theoretical is 7.7 p.s.i. excluding adsorption on catalyst) at ambient temperature within 2 hours. The resulting off-white mixture was diluted with acetic acid and tetrahydrofuran, solids filtered, washed, and dried to give 8.5 g. light grey solid. Of this weight, 2.1 g. was catalyst and very little could be inorganic salt as no precipitate was obtained from the filtrate on addition of ether. The yield of tetraamine bis(sulfuric acid salt) was 6.4 g. (100%). The solid was extracted with 50 cc. of water pre-boiled under nitrogen. Rapid darkening of the liquor was noted. A small amount of dark insoluble solid was filtered off and 13 g. conc. sulfuric acid added to the filtrate to precipitate product. The latter was washed successively with 25% sulfuric acid, acetic acid, and alcohol to give, after drying, 1.2 g. of rust-colored solid. Alcohol washing ($2x$) and drying of the insolubles led to reclaiming of 5.2 g. dark solid. Elemental analysis of the 1.2 g. material confirmed the tetramine bis(sulfuric acid salt) structure assignment. Calculated for $C_5H_9N_5 \cdot 2H_2SO_4$: (Mol. wt.=335) C, 17.9; H, 3.9; N, 20.9; S, 19.1; O, 38.2. Found: C, 17.8; H, 4.9; N, 20.4; S, 19.0; O, (calculated) 37.9 (by difference).

(B) 2,3,5,6 - tetraaminopyridine trihydrochloride: The sulfate salt-catalyst mixture from Example 8A can be freed from catalyst and converted to the trihydrochloride as follows: The solid mixture (17 g.) was stirred well with 100 cc. of 5% hydrochloric acid which had been blown with nitrogen at reflux, filtered hot, cooled, and saturated with hydrogen chloride. The purple solid was filtered, washed with alcoholic hydrogen chloride, and vacuum-dried to yield 5.8 g. tetraaminopyridine trihydrochloride monohydrate. Calculated for $C_5H_9N_5 \cdot 3HCl \cdot H_2O$: C, 22.5; H, 5.2; N, 26.2; Cl, 39.9. Found: C, 22.5; H, 5.3; N, 26.5; Cl, 40.2.

(C) 2,3,5,6 - tetraaminopyridine trihydrobromide: In a manner somewhat similar to Example 8B, using hydrogen bromide instead of hydrogen chloride, the hydrobromide salt was obtained. The salt was dried under high vacuum at 90° C. over phosphorus pentoxide. Calculated for

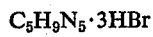
$C_5H_9N_5 \cdot 3HBr$

Br, 62.8. Found. Br, 62.4.

The hydrobromide salt was also prepared by dissolving the sulfuric acid or hydrochloride salt in phosphoric acid, expelling hydrogen chloride (in the case of the hydrochloride salt), adding hydrobromic acid, and precipitating the trihydrobromide with cold isopropyl alcohol-tetrahydrofuran.

(D) 2,3,5,6 - tetraaminopyridine trifluoroacetate: 2,6-diamino-3,5-dinitropyridine (2.5 g.) was reduced in 10 cc. trifluoroacetic acid and 40 cc. acetic acid with 0.2 g. 5% palladium/charcoal catalyst at an initial temperature of 40° C. and a hydrogen pressure of 90 p.s.i.g. The trifluoroacetate salt was recovered by filtering off catalyst and removing solvent and excess acid. All operations were performed under an inert atmosphere.

(E) 2,3,5,6 - tetraaminopyridine sulfonate salts: 2,6-diamino-3,5-dinitropyridine (5 g. or 0.025 mole) was suspended in a solution of 25 cc. methanesulfonic acid and 50 cc. methanol. One gram of 5% palladium charcoal catalyst was added and the mixture subjected to hydrogenation with an initial temperature of 70° C. and a hydrogen pressure of 90 p.s.i.g. When no further hydrogen was taken up the reaction was cooled to room temperature, sufficient water added to dissolve any suspended salt, and the mixture filtered. The filtrate was concentrated and isopropyl alcohol added with cooling and stirring to precipitate the tris(methanesulfonate salt) of 2,3,5,6-tetraaminopyridine. Calculated for $C_5H_9N_5 \cdot 3CH_4SO_3$: N, 16.4; S, 22.5. Found: N, 16.2; S, 22.2.

The above salt was also prepared by dissolving the 2,3,5,6-tetraaminopyridine trihydrochloride in methanesulfonic acid, removing the liberated hydrogen chloride and then precipitating the methanesulfonate salt.

In somewhat similar manner using benzenesulfonic acid the benzenesulfonate salt may be obtained.

EXAMPLE 9

2,3,5,6-tetraaminopyridine hydrochloride salt by reduction in phosphoric acid-formic acid In a 500 cc. Parr bottle 2,6-diamino-3,5-dinitropyridine (15 g.) was dissolved in 100 cc. hot 85% ortho phosphoric acid, the solution was cooled to 25° C. and diluted with 135 cc. formic acid saturated with hydrogen chloride and 15 cc. concentrated hydrochloric acid. 5% palladium on charcoal (2.88 g.) was added and the mixture placed under 55 p.s.i.g. hydrogen pressure at room temperature. The reduction was carried out at room temperature until no further hydrogen uptake was noticed. The mixture was filtered, the solid washed with 50 cc. formic acid containing several cc. of conc. hydrochloric acid, and finally with ethanolic hydrogen chloride. Upon drying, 4.0 g. of black solid was recovered. The filtrate was added to a cold solution of 500 cc. tetrahydrofuran and 50 cc. conc. hydrochloric acid to precipitate off-white 2,3,5,6-tetraaminopyridine hydrochloride salt.

A similar reduction performed in 85% $H_3PO_4$-methanol proceeds readily at 75° C. Upon removal of catalyst by filtration and addition of concentrated HCl, a high yield of hydrochloride salt is precipitated. 2-methoxyethanol and 2,2,2-trifluoroethanol are also satisfactory cosolvents with the phosphoric acid for this reduction. The product of this example can be used to dye hair, as in British Pat. No. 995,870.

EXAMPLE 10

2,3,5,6-tetraaminopyridine free base

To a hot suspension of 15 g. 2,6-diamino-3,5-dinitropyridine in 200 cc. 95% ethanol and 40 cc. pyridine was added 1.5 g. 5% palladium on charcoal. The mixture was subjected to hydrogenation with an initial pressure of 55 p.s.i.g. at about 60° C. After 20 p.s.i. of hydrogen were absorbed the temperature was raised to about 75° C. When no further hydrogen uptake (total of 39.4 p.s.i.) occurred, the reaction mixture was cooled and 50 cc. of benzene-heptane (1:1 by v./v.) was added. The mixture was filtered in a dry box under nitrogen and worked up in the dry box as follows: The filter cake was extracted with 150 cc. of deaerated N,N-dimethylacetamide and filtered. To the filtrate was added 150 cc. of benzene-heptane (1:1 by v./v.) to precipitate product which was washed and vacuum dried to yield 4.3 g. (41%) of green solid. Elemental analysis was as follows: Calculated for $C_5H_9N_5$: C, 43.2; H, 6.5. N, 50.4. Found: C, 42.3; H, 6.1; N, 48.9. The product is extremely sensitive to atmospheric oxidation.

When the hydrogenation is performed in the absence of pyridine a much slower reduction is observed.

The trichloroacetic acid salt of 2,3,5,6-tetraaminopyridine may be obtained by treating the free base with a cold solution of trichloroacetic acid in acetic acid.

EXAMPLE 11

2,3,5,6-tetraaminopyridine free base

To a hot suspension of 15 g. 2,6-diamino-3,5-dinitro pyridine in 200 cc. 95% ethanol and 40 cc. pyridine was added 1.47 g. 3.5% platinum on charcoal. The mixture was subjected to hydrogenation with an initial pressure of 55 p.s.i.g. at about 65° C. When no further uptake (35.9 p.s.i. after 1 hour) of hydrogen occurred at this temperature, the reaction mixture was cooled to about −10° C and rapidly filtered. The cake was washed with benzene-hexane (1:1 by v./v.) and then placed in a large sublimation apparatus. The system was evacuated and then heated 6 hours at 185–210° C. at 0.008–0.02 mm. mercury, and 0.5 g. of tetraaminopyridine sublimate recovered under nitrogen.

The residue (10.1 g.) from the sublimation was stirred with 70 cc. of 85% phosphoric acid and filtered. To the filtrate was added 100 cc. conc. hydrochloric acid. The mixture was cooled to −10° C. and suction filtered. After washing and vacuum drying, 8.0 g. of hydrochloride salt was recovered as product.

When a stoichiometric quantity of triethylamine is substituted for the pyridine in the above reduction, a significantly slower rate of reduction occurs.

EXAMPLE 12

Acetylation of 2,3,5,6-tetraaminopyridine trihydrochloride (A) Using two equivalents of acetic anhydride: Under nitrogen 2.1 cc. (0.021 mole) acetic anhydride was added to a cold, stirred mixture of 2.48 g. (0.01 mole) 2,3,5,6-tetraaminopyridine trihydrochloride and 15 g. anhydrous, deoxygenated N-methylpyrrolidinone. The reaction was allowed to warm up to 30° C. at which time it became homogeneous but shortly thereafter deposited a crystalline mass. The reaction stoood overnight and then was diluted with three times the volume of tetrahydrofuran. The solid was filtered, washed and dried to give 2.4 g. of white crystals. This product appears to change form at 225–227° C., mostly liquefying and then drying. Analysis indicates the structure to be a monohydrate monohydrochloride of a diacetylated 2,3,5,6-tetraaminopyridine. Calculated for $C_9H_{14}N_5ClO_2 \cdot H_2O$: C, 38.9; H, 5.8; N, 25.2; Cl, 12.8. Found: C, 42.1; H, 5.9; N, 25.6; Cl, 12.7.

(B) Using two equivalents of acetyl chloride: Procedure A was essentially followed using 2.63 g. (0.033 mole) acetyl chloride, 3.72 g. (0.015 mole) 2,3,5,6-tetraaminopyridine trihydrochloride, and 60 cc. N,N-dimethylacetamide. A whitish solid was obtained which changed from at 223–225° C., mostly liquefying but solidifying as the temperature was raised. Elemental analysis was similar to Example 12A.

(C) Using four equivalents of acetyl chloride: Under nitrogen 9.4 g. (0.12 mole) acetyl chloride was added to a stirred mixture of 7.4 g. (0.03 mole) 2,3,5,6-tetraaminopyridine trihydrochloride and 60 g. anhydrous, deoxygenated N,N - dimethylacetamide. A mild exotherm occurred and the reaction was allowed to stir overnight at room temperature. Methanol, 40 cc., was added and the mixture stirred with an equal volume of ethyl ether to complete precipitation of solid. The solid was reslurried with 150 cc. isopropyl alcohol, filtered, and dried to yield 8.1 g. off-white solid, M.P. 271–273° C. Elemental analysis indicates the product is a tetraacetylated monohydrochloride. Calculated for $C_{13}H_{18}N_5O_4Cl$: C, 48.2; H, 5.6; N, 21.6; Cl, 11.0. Found: C, 45.1: H, 5.4; N, 20.4; Cl, 10.6.

EXAMPLE 13

Preparation of 3,5-diamino-2,6-diacetamido-pyridine trihydrochloride

To a stirred solution of 218 g. (2.0 mole) 2,6-diaminopyridine in 1 liter of tetrahydrofuran was gradually added 440 cc. (2.2 mole) acetic anhydride. The reaction was refluxed 4 hours, diluted with 400 cc. hexane, cooled and 2,6-diacetamidopyridine (348 g., 90%, M.P. 206–208° C.) filtered off. One hundred and forty-five grams (0.75 mole) of this product were dissolved in 750 cc. sulfuric acid and the solution cooled to ice temperature. A cold concentrated solution of nitric acid (2.25 mole) in acetic acid was added over 1¼ hours so that the temperature was maintained at 5–10° C. The reaction was allowed to warm up to room temperature, stirred 15 hours, and then added to 2700 cc. of ice water. The yellow precipitate was washed well with aqueous methanol, filtered, and vacuum-dried to afford a 35% yield of 2,6-diacetamido-3,5 - dinitropyridine, M.P. (dec.) 300–301° C. Three grams of this material were reduced in 40 cc. acetic acid and 10 cc. concentrated sulfuric acid using 0.30 g. 5% palladium/charcoal catalyst at a temperature of 40–50° C. and an initial hydrogen pressure of 85 p.s.i.g. When the reduction was complete, 50 cc. of cold acetic acid was added and the solids filtered off. Washing with methanol-isopropyl alcohol gave, after drying, 4.2 g. of the sulfate salt. This salt was stirred well with 80 cc. concentrated hydrochloric acid and filtered. The clear filtrate was treated with isopropyl alcohol and ether to precipitate 1.0 g. solid. Analysis is indicative of a diacetylated tetraaminopyridine trihydrochloride monohydrate. Calculated for $C_9H_{18}N_5O_3Cl_3$: C, 30.8; H, 5.1; Cl, 30.3; O, 13.7. Found: C, 26.7; H, 4.9; Cl, 30.8; O, 13.0.

EXAMPLE 14

Polybenzimidazole from 2,3,5,6-tetraaminopyridine and isophthalic acid

A 500 cc. 3-necked flask equipped with a Trubore stirrer, nitrogen inlet, and calcium chloride drying tube was charged with 240 g. of 116% polyphosphoric acid. The acid was deaerated by sweeping with a strong current of nitrogen at 110–120° C. for 2 hours. Upon cooling to 60° C. 4.96 g. (0.20 mole) 2,3,5,6-tetraaminopyridine trihydrochloride was added in two portions and the temperature gradually raised to 120° C. to expel hydrogen chloride. Isophthalic acid (3.32 g. or 0.020 mole) was then added and the polymerization carried out at about 180° C. for 20 hours. The hot dark brown solution was gradually poured, with good stirring, into 1 liter of aqueous methanol (1:1 by v./v.) which had been chilled to −10° C. The polymer was washed well with water and aqueous methanol containing amonia and vacuum dried at 200–220° C. to afford 4.4 g. (94%) very dark solid. The polymer was redissolved in 75 cc. warm 85% phosphoric acid, 100 cc. acetic acid added and the solution poured into 500 cc. water, washed as above and dried to give 3.5 g. solid. This polymer was resubjected to fresh hot polyphosphoric acid (100 g.) under nitrogen at 220–225° C. for 4½ hours. The polymer was precipitated into aqueous acetic acid and worked up as above to recover 3.1 g. Elemental analysis, calculated for $C_{13}H_7N_5$ (equiv. wgt. 233): C, 66.9; H, 3.0; N, 30.1. Found: C, 64.9; H, 3.3; N, 28.5. A 3% weight loss was observed when the polymer was heated in air to at least 500° C.

In a similar fashion essentially the same polymer may be obtained by using dimethyl isophthalate or the diamide of isophthalic acid.

EXAMPLES 15–24

When the procedure of Example 20A is repeated using each of the following dibasic acids instead of isophthalic acid (as free acid or as the dimethyl ester or diamide), the corresponding polybenzimidazole is produced.

(15) terephthalic acid
(16) 2,6-naphthalenedicarboxylic acid
(17) 4,4'-biphenyldicarboxylic acid
(18) bis(4-carboxyphenyl) ether
(19) 4,4'-benzophenonedicarboxylic acid
(20) bis(4-carboxyphenyl) sulfone
(21) 3,5-pyridinedicarboxylic acid
(22) 2,5-pyrazinedicarboxylic acid
(23) 2,7-anthraquinonedicarboxylic acid
(24) 1,4-cyclohexanedicarboxylic acid

EXAMPLE 25

Polybenzimidazole prepolymer from 2,3,5,6-tetraaminopyridine trihydrochloride and isophthaloyl chloride (A) Hydrochloride salt added to acid chloride: Under an inert atmosphere 2.48 g. (0.01 mole) 2,3,5,6-tetraaminopyridine trihydrochloride was added to a stirred solution of 2.03 g. (0.01 mole) isophthaloyl chloride in 20 g. dry deoxygenated N-methylpyrrolidinone. The reaction flask was immersed in an ice water bath for 2 hours and then kept at room temperature for 24 hours. The polymer solution was precipitated with 60 cc. methanol, stirred well, and filtered. The polymer was washed well and dried at 65° C. under vacuum to give 3.2 g. off-white solid which was soluble in dimethylsulfoxide and methanesulfonic acid. Analysis calculated for $C_{13}H_{11}H_5O_2 \cdot HCl$: C, 51.0; H, 3.9; Cl, 11.9. Found: C, 51.5; H, 5.2; Cl, 10.7.

(B) Acid chloride added to hydrochloride salt: Under an inert atmosphere a solution of 4.06 g. (0.02 mole) isophthaloyl chloride in 7 g. N-methylpyrrolidinone was gradually added to a stirred mixture of 4.96 g. (0.02 mole) 2,3,5,6-tetraaminopyridine trihydrochloride and 51 g. N-methylpyrroyidinone. The reaction was maintained at 10–15° C. for several hours and then kept at room temperature for 1 day. The polymer solution was worked up as in Example 25A to give 5.8 g. prepolymer which was soluble in N-methylpyrrolidinone, dimethylsulfoxide, and methanesulfonic acid. Analysis calculated for $C_{13}H_{11}N_5O_2 \cdot HCl$: C, 51.0; H, 3.9; Cl, 11.9. Found: C, 50.8; H, 5.3; Cl, 11.2.

Similarly other acid salts of the above prepolymer may be formed by replacing the trihydrochloride salt by one of the following 2,3,5,6-tetraaminopyridine tris(acid salts): hydrobromide, methanesulfonate and trifluoroacetate or by the mono (trifluoromethanesulfonate) dihydrobromide salt. Facile formation of prepolymer acid salt was also accomplished by replacing the N-methylpyrrolidinone, in whole or in part, by N,N-dimethylacetamide.

A viscous solution of the hydrochloride prepolymer was used to cast films which were dried under inert atmosphere at 150° C. and finally at 250–300° C. The heating caused evolution of hydrogen chloride and cyclization to the corresponding polybenzimidazole structure. The product was rendered resistant to solvent and chemical attack and is thus useful as a polymeric film. Little weight loss was observed when the polymer was heated in air to at least 500° C.

Essentially the same cyclized polymer may be obtained by dissolving 2 g. of the hydrochloride prepolymer in 100 g. of polyphosphoric acid and heating 10 hours at 180° C. The cyclized polymer which is isolated as described in Example 14 is essentially identical to the product of Example 14.

(C) Preneutralization of prepolymer from Example 25B: The procedure of Example 25B was repeated except that a solution of 11.11 g. (0.11 mole) triethylamine in 50 cc. N-methylpyrrolidinone was added prior to precipitation of polymer with alcohol. The polymer (5.7 g.) isolated was soluble in dimethylsulfoxide and methanesulfonic acid and had an intrinsic viscosity (dimethylsulfoxide, 28° C.) of 0.6 dl./g. Analysis calculated for $C_{13}H_{11}N_5O_3$: C, 58.0; H, 4.1; N, 26.0. Found: C, 57.0; H, 4.3; N, 25.5.

This polymer could be cyclized and converted to a film in a manner described in Example 25B. Fibers of the neutralized benzimidazole prepolymer were prepared as follows: A hot viscous polymer solution was dry spun into a nitrogen stream preheated to 250° C. Fibers were drawn at temperatures of at least 270° C. and then relaxed at 330° C. The fibers so produced were unchanged after 1 day exposure to hot dilute aqueous acid or alkali and showed good thermal stability in air at 400° C.

Fibers were also obtained by wet spinning polymer which resulted from cyclization in polyphosphoric acid. A hot viscous solution of cyclized polymer in methanesulfonic acid was extruded from a syringe fitted with an 18 gauge needle, into aqueous methanesulfonic acid. The resultant fiber was thoroughly washed with water, dilute sodium carbonate, again in water and dried.

(D) Amine-terminated benzimidazole prepolymer: The procedure of Example 25B was followed using 0.016 mole isophthaloyl chloride. The product which was a soluble, amine-terminated hydrochloride benzimidazole prepolymer could be used directly to form other heterocyclic polymers. For example, reaction would be effected with terephthaloyl chloride, trimellitic anhydride monoacid chloride, or 1,2,4,5-benzenetetracarboxylic acid dianhydride.

EXAMPLES 26–35

When the procedure of Example 25B is repeated using the diacid chloride of each of the following dibasic acids instead of isophthaloyl chloride, the corresponding polybenzimidazole prepolymers and cyclized polymers are produced and films of good solvent and chemical resistance are obtained.

(26) terephthalic acid
(27) 4,4'-biphenyldicarboxylic acid
(28) 2,6-naphthalenedicarboxylic acid
(29) bis(4-carboxyphenyl) ether
(30) 4,4'-benzophenonedicarboxylic acid
(31) bis(4-carboxyphenyl) sulfone
(32) 2,5-pyrazinedicarboxylic acid
(33) bis(5-carboxy-2-pyridyl) ether
(34) 2,5-dichloroterephthalic acid
(35) 1,4-cyclohexanedicarboxylic acid

EXAMPLES 36–39

When the procedure of Example 25B is repeated using each of the following tetramine salts instead of 2,3,5,6-tetraaminopyridine trihydrochloride the corresponding polybenzimidazole prepolymer and cyclized polybenzimidazole are produced and films of good solvent and chemical resistance are obtained.

(36) Example 25B except replacing 0.007 mole 2,3,5,6-tetraaminopyridine trihydrochloride with 0.007 mole 3,3'-diaminobenzidine tetrahydrochloride
(37) Example 25B except replacing 0.007 mole 2,3,5,6-tetraaminopyridine trihydrochloride with 0.007 mole 3,3',4,4'-tetraaminobenzophenone trihydrochloride For Examples 38 and 39 0.04 mole hydrogen chloride is also added prior to addition of isophthaloyl chloride.
(38) 4,4'-5,5'-tetraamino-2,2'-bipyridine dihydrochloride
(39) Example 25B except replacing 0.01 mole 2,3,5,6-tetraaminopyridine trihydrochloride with 0.01 mole 4,4',5,5'-tetraamino-2,2'-bipyridine dihydrochloride.

EXAMPLE 40

Polyheterocycle from 2,3,5,6-tetraaminopyridine trihydrochloride and trimellitic anhydride acid chloride To a solution of 0.01 mole 2,3,5,6-tetraaminopyridine trihydrochloride in 200 g. deaerated polyphosphoric acid was added, under an inert atmosphere, 2.10 g. (0.01 mole) of trimellitic anhydride monoacid chloride. The addition was made at about 100° C. and then the reaction temperature gradually raised to 180° C. and kept there for 15 hours. The polymer was isolated in good yield in a manner similar to that described in Example 14. Its infrared spectrum showed imide bands at about $5.7\mu$ and $13.9\mu$ and imidazole at about $6.2\mu$.

Similar polymer is obtained by using trimellitic acid or trimellitic anhydride in place of trimellitic anhydride monoacid chloride.

EXAMPLES 41–49

When the procedure of Example 40 is repeated, replacing trimellitic anhydride acid chloride by the anhydride acid chlorides derived from the following tribasic acids, the corresponding polyheterocycles are obtained.

(41) 1,4,5-naphthalenetricarboxylic acid
(42) 2,3,6-naphthalenetricarboxylic acid
(43) 2,3,6-anthraquinonetricarboxylic acid
(44) 3,3',4-tricarboxybiphenyl
(45) 3,4-dicarboxyphenyl 4'-carboxyphenyl ether
(46) 3,4-dicarboxyphenyl 3'-carboxyphenyl sulfone
(47) 3,3',4-tricarboxybenzophenone
(48) 2,3,6-pyridinetricarboxylic acid
(49) 1,2,4-cyclohexanetricarboxylic acid

EXAMPLE 50

Heterocyclic polymer from 2,3,5,6-tetraaminopyridine and trimellitic anhydride monoacid chloride Under an inert atmosphere a solution of 4.21 g. (0.02 mole) trimellitic anhydride monoacid chloride in 10 cc. N-methylpyrrolidinone was added with stirring to a cold mixture of 4.96 g. (0.02 mole) 2,3,5,6-tetraaminopyridine trihydrochloride and 25 cc. N,N-dimethylacetamide. The reaction was kept 2 hours at ice temperature and then allowed to warm up to room temperature overnight. The polymer was isolated by dilution with 25 cc. N,N-dimethylacetamide, precipitation with 150 cc. methanol, and filtration. Vacuum drying afforded 5.6 g. light colored solid which was soluble in N,N-dimethylacetamide and methanesulfonic acid. Calculated for $C_{14}H_{11}N_5O_4 \cdot HCl$: N, 20.0; Cl, 10.2. Found: N, 19.6; Cl, 9.3.

In similar fashion soluble prepolymers were prepared from the 2,3,5,6-tetraaminopyridine trihydrobromide and trimethanesulfonate salts.

A 15% solution of the hydrochloride prepolymer in N,N-dimethylacetamide was used to prepare films in a manner described in Example 25B. The film possessed excellent solvent and chemical resistance and showed little or no weight loss when treated in air to temperatures of at least 500° C.

Fibers showing similar properties were formed in a manner similar to that described in Example 25C.

When a solution of 2 g. of the hydrochloride prepolymer in 100 g. polyphosphoric was heated 10 hours at 180° C. and worked up as in Example 14, a polymer essentially identical to that described in Example 40 was obtained.

EXAMPLES 51 and 52

When the procedure of Example 50 is repeated using each of the following tetramine salts instead of 2,3,5,6-tetraaminopyridine trihydrochloride, the corresponding polyheterocyclic prepolymer and cyclized polymer are produced and films of good solvent and chemical resistance are obtained.

For examples 51 and 52 0.04 mole hydrogen chloride is also added prior to addition of trimellitic anhydride monoacid chloride.

(51) 4,4',5,5'-tetraamino-2,2'-bipyridine dihydrochloride
(52) Example 50 except replacing 0.01 mole 2,3,5,6-tetraaminopyridine trihydrochloride with 0.01 mole 4,4',5,5'-tetraamino-2,2'-bipyridine dihydrochloride.

EXAMPLE 53

Heterocyclic polymer from 2,3,5,6-tetraaminopyridine and 1,4,5,8-naphthalenetetracarboxylic acid To a 500 3-necked flask fitted with a Trubore stirrer and nitrogen inlet was added 333 g. 116% polyphosphoric acid. The polyphosphoric acid was deoxygenated by heating overnight at 110° C. with nitrogen bubbling through the stirred acid. At 75° C., 3.32 g. (0.0133 mole) of 2,3,5,6-tetraaminopyridine trihydrochloride was added and the solution heated at 75–80° C. overnight under nitrogen to expel hydrogen chloride. To this solution was added 4.05 g. (0.0133 mole) 1,4,5,8-naphthalenetetracarboxylic acid and the mixture slowly heated to 180° C. and maintained at that temperature for 10 hours. The hot viscous solution was slowly poured with good stirring into 1.5 liter of pre-chilled (ca. −20° C.) methanol. The polymer was washed well with methanol and then dried at 190–200° C. under reduced pressure to yield 3.4 g. (76%) dark solid. The polymer was further purified by dissolving 2 g. in 50 cc. of methanesulfonic acid and reprecipitating into methanol. The precipitate was washed well with methanol and then methanol containing ammonia and water and finally dried 6 hours at 230–250° C. at 0.05–0.1 mm. mercury to afford 1.5 g. of product (75% recovery). Analysis calculated for $C_{19}H_5N_5O_2$ (equiv. wgt. 335): C, 68.0; H, 1.5; N, 20.9. Found: C, 66.2; H, 2.2; N, 19.3; Ash, 0.3.

The extreme thermal stability of this polymer is illustrated by the following experiment. The polymer (0.12 g.) was placed in an open 10 cc. porcelain crucible and heated with a burner (flame temperature immediately below the crucible was 1000–1100° C.). It took over 2 hours for complete (98%) combustion to occur.

Essentially the same polymer is obtained by replacing the naphthalenetetracarboxylic acid with an equivalent amount of 1,4,5,8-naphthalenetetracarboxylic acid dianhydride in the initial polymerization. The resulting product also exhibited good thermal stability.

EXAMPLES 54–63

When the procedure of Example 53 is repeated using each of the following tetraacids (or corresponding dianhydrides) instead of 1,4,5,8-naphthalenetetracarboxylic acid, the corresponding polyheterocycles are obtained.

(54) 1,2,4,5-benzenetetracarboxylic acid
(55) 1,2,4,5-cyclohexanetetracarboxylic acid
(56) 2,3,6,7-naphthalenetetracarboxylic acid
(57) 3,3'4,4'-benzophenonetetracarboxylic acid
(58) bis(3,4-dicarboxyphenyl) sulfone
(59) bis(3,4-dicarboxyphenyl) ether
(60) 3,6-dichloro-1,2,4,5-benzenetetracarboxylic acid
(61) 2,3,6,7-anthraquinonetetracarboxylic acid
(62) 2,3,5,6-pyridinetetracarboxylic acid
(63) 2,3,5,6-pyrazinetetracarboxylic acid

EXAMPLE 64

Polyheterocycle from 2,3,5,6-tetraaminopyridine and 1,2,4,5-benzenetetraacid dianhydride Under an inert atmosphere 1.07 g. (4 mmole) of 1,2,4,5-benzenetetraacid dianhydride is added to a solution of 0.556 g. (4 mmole) 2,3,5,6-tetraaminopyridine in 10 cc. dry N,N-dimethylacetamide (purified and deareated). The last 5% of dianhydride is added as a solution in the same solvent. Reaction at ambient temperature leads to the intermediate amine-substituted polyamide-acid which can be isolated by precipitation into acetone, washing, and drying at mild temperatures. The polymer of Example 54 can be obtained by using the above solution to cast a film which, after drying at 150–350° C., affords the cyclized polymer.

In similar fashion, the corresponding dianhydrides of Examples 54–63 can be used.

EXAMPLE 65

Heterocyclic prepolymer from 2,3,5,6-tetraaminopyridine and 1,4,5,8-naphthalenetetraacid dianhydride Under an inert atmosphere 4.02 g. (0.015 mole) 1,4,5,8-naphthalenetetraacid dianhydride was added to a stirred mixture of 3.72 g. (0.015 mole) 2,3,5,6-tetraaminopyridine trihydrochloride, 3.0 g. (0.03 mole) methanesulfonic acid, and 41 g. anhydrous, deoxygenated N-methylpyrrolidinone. The reaction was heated 2 hours at 30–35° C. and then 17 hours at about 40° C. Polymer was precipitated by addition of methanol, washed well, and dried overnight at 65° C. under high vacuum to give 5.4 g. mustard-colored solid which was soluble in N,N-dimethylacetamide and methanesulfonic acid. Analysis calculated for $C_{19}H_{13}N_5O_6 \cdot HCl$: C, 51.3; H, 3.2; N, 15.8; O, 21.6. Found: C, 51.8; H, 3.8; N, 14.7; O, 23.8.

Two grams of this material upon heating 4 hours at 375° C. under high vacuum afforded 1.4 g. brown solid which was essentially identical to the polymer prepared in Example 53. The same product could also be obtained by heating a dilute polyphosphoric acid solution of the hydrochloride prepolymer 15 hours at 180° C. and isolating polymer as described in Example 53. Cyclized polymer prepared by either route was insoluble in N,N-dimethylacetamide but soluble in methanesulfonic acid.

EXAMPLE 66

Heterocyclic prepolymer from 2,3,5,6-tetraaminopyridine and 1,2,4,5-benzenetetracarboxylic acid dianhydride (A) Reactants in equimolar concentration Under an inert atmosphere 4.36 g. (0.02 mole) 1,2,4,5-benzenetetracarboxylic acid dianhydride was added to 30 cc. anhydrous, deoxygenated N,N-dimethylacetamide. The mixture was briefly warmed to 50° C. and then cooled to 25° C. at which time 4.96 g. (0.02 mole) 2,3,5,6-tetraaminopyridine trihydrochloride was added with good stirring. The reaction, which became homogeneous, was stirred at ambient temperature for 5 hours. The polymer was precipitated by the addition of 50 cc. methanol and 150 cc. water. This product was filtered, washed well with water, and vacuum dried to yield 6.2 g. of yellow-brown solid. Analysis calculated for: $C_{15}H_8N_5O_6 \cdot HCl$: C, 46.1; H, 2.3; Cl, 9.1. Found: C, 46.3; H, 2.5; Cl, 8.4. Titration of the filtrate indicated the presence of 0.04 equivalents of acid.

In similar fashion soluble prepolymers were prepared when 2,3,5,6-tetraaminopyridine trihydrobromide or mono(trifluoromethanesulfonate) dihydrobromide were used to replace the trihydrochloride salt.

Solutions of the hydrochloride prepolymer in N,N-dimethylacetamide were used to prepare films as described in Example 25B. Such films of cyclized polymer possessed excellent solvent and chemical resistance. Fibers prepared in a manner similar to that described in Example 25C also exhibited excellent solvent and chemical resistance.

The hydrochloride prepolymer (1.1 g.) was heated at 150-200° C. under high vacuum for 1 hour and then at 250-300° C. for 4 hours to yield 0.82 g. brown solid. This solid was insoluble in N,N-dimethylacetamide, soluble in methanesulfonic acid, and lost essentially no weight when heated in air to temperatures of at least 550° C.

(B) Amine-terminated prepolymer by use of excess tetramine: The procedure of Example 66A was followed using 0.016 mole 1,2,4,5-benzenetetracarboxylic acid dianhydride. The product which was a soluble, amine-terminated, hydrochloride prepolymer could be used to form other heterocyclic polymers. For example, it could be reacted with isophthaloyl chloride, terephthaloyl chloride or trimellitic anhydride monoacid chloride using N-methylpyrrolidinone as solvent.

EXAMPLES 67–76

When the procedure of Example 66A is repeated using the corresponding dianhydrides of each of the following tetra-acids instead of 1,2,4,5-benzenetetracarboxylic acid dianhydride, or in part replacing the 2,3,5,6-tetraaminopyridine trihydrochloride, the corresponding prepolymers, cyclized polyheterocycles, and films of good solvent and chemical resistance are obtained.

(67) 1,2,4,5-cyclohexanetetracarboxylic acid
(68) 2,3,6,7-naphthalenetetracarboxylic acid
(69) 3,3',4,4'-benzophenonetetracarboxylic acid
(70) bis(3,4-dicarboxyphenyl) sulfone
(71) bis(3,4-dicarboxyphenyl) ether
(72) 3,6-dichloro-1,2,4,5-benzenetetracarboxylic acid
(73) 2,3,5,6-pyrazinetetracarboxylic acid
(74) Example 66A except replacing 0.01 mole 2,3,5,6-tetraaminopyridine trihydrochloride with 0.01 mole 4,4',5,5'-tetraamino-2,2'-bipyridine dihydrochloride
(75) Example 66A except replacing 0.007 mole 2,3,5,6-tetraaminopyridine trihydrochloride with 0.007 mole diamino-benzidine tetrahydrochloride
(76) Example 66A except replacing 0.007 mole 2,3,5,6-tetraaminopyridine trihydrochloride with 0.007 mole 3,3',4,4'-tetraaminobenzophenone trihydrochloride

EXAMPLE 77

When the procedure of Example 66A is repeated using the following tetramine salt instead of 2,3,5,6-tetraaminopyridine trihydrochloride, the corresponding heterocyclic prepolymer and cyclized polymer are produced and films of good solvent and chemical resistance are obtained.

(77) 4,4',5,5'-tetraamino-2,2'-bipyridine dihydrochloride

EXAMPLE 78

Polyheterocycle from 2,3,5,6-tetraaminopyridine, m-phenylenediamine, and isophthaloyl chloride Under an inert atmosphere a solution of 3.05 g. (0.015 mole) isophthaloyl chloride in 8 g. N,N-dimethylacetamide was added with stirring to an ice cooled mixture of 1.86 g. (0.0075 mole) 2,3,5,6-tetraaminopyridine trihydrochloride, 0.81 g. (0.0075 mole) m-phenylenediamine, and 20 g. N-methylpyrrolidinone. The reaction was kept at ice temperature 1 hour and then allowed to stand at room temperature overnight. The viscous solution was diluted with 15 g. N-methylpyrrolidinone and polymer precipitated by addition of 100 cc. methanol. The mixture was stirred well, precipitate filtered off, washed, and vacuum dried at 70° C. to give 4.0 g. polymer. The polymer was soluble in N-methyl-pyrrolidinone, dimethylsulfoxide, and formic acid. Calculated for $C_{27}H_{21}N_7O_4 \cdot HCl$: N, 18.0; Cl, 6.5. Found N, 18.5; Cl, 6.0.

Similar results are obtained if m-phenylenediamine mono- or dihydrochloride is used.

When the above experiment was repeated using 0.015 mole m-phenylenediamine and no tetraamine salt, the poly(m-phenylene isophthalamide) obtained was not soluble in dimethylsulfoxide or formic acid. This is taken as evidence that the above soluble polymer is not a mixture of poly(m-phenylene isophthalamide) and benzimidazole prepolymer derived from 2,3,5,6-tetraaminopyridine.

The soluble polymer was used to prepare films and fibers in a manner described in Examples 25 B and 25C, respectively. Films and fibers possessing good solvent resistance were obtained. 2,3,5,6-tetraaminopyridine trihydrobromide or tris(trifluoroacetate) can also be used instead of the trihydrochloride to prepare soluble polymer which can subsequently be converted to useful film.

Cyclized polyamide-polybenzimidazole could also be obtained by heating 2 g. hydrochloride prepolymer in 100 g. polyphosphoric acid for 15 hours at 180° C. Precipitation, washing and drying afforded the cyclized polymer which showed excellent solvent and thermal resistance.

EXAMPLES 79–85

When the procedure of Example 78 is repeated using each of the following diamines instead of m-phenylenediamine, the corresponding heterocyclic prepolymers, cyclized polymers, and films are obtained:

(79) p-phenylenediamine
(80) 4,4'-biphenyldiamine
(81) 1,5-naphthalenediamine
(82) bis(4-aminophenyl) sulfone
(83) 3,8-dibenzofurandiamine
(84) 3,3'-dimercaptobenzidine dihydrochloride
(85) 4,4'-diamino-m,m'-biphenol dihydrochloride

EXAMPLE 86

Heterocyclic polymer from 2,3,5,6-tetraaminopyridine, isophthaloyl chloride, and trimellitic anhydride acid chloride (A) Acid derivatives added separately: Under an inert atmosphere, a solution of 2.03 g. (0.01 mole) isophthaloyl chloride in 4 cc. N-methylpyrrolidinone was added, with good stirring, to a mixture of 4.96 g. (0.02 mole) 2,3,5,6-tetraaminopyridine trihydrochloride and 30 g. anhydrous, deoxygenated N-methylpyrrolidinone at 5° C. After 2 hours at ice temperature a solution of 2.10 g. (0.01 mole) of trimellitic anhydride monoacid chloride in 6 cc. N-methylpyrrolidinone was gradually added to the polymerization reaction. The polymerization was kept cold for 2 hours and then allowed to stand overnight at room temperature. Polymer was precipitated with methanol, washed well, and dried at 65° C. under high vacuum to give 5.8 g. This solid was soluble in N,N-dimethylacetamide and methane-sulfonic acid.

(B) Acid derivatives added simultaneously: Example 86A was repeated except a solution of 0.01 mole each of isophthaloyl chloride and trimellitic anhydride monoacid chloride in 10 cc. N-methylpyrrolidinone was added simultaneously to the tetramine salt. The product showed minor variations in the infrared spectrum from the polymer of Example 86A. Both polymers upon heating at 250–300° C. gave the corresponding cyclized polymer which exhibited excellent solvent and thermal resistance.

EXAMPLE 87

Heterocyclic polymer from 2,3,5,6-tetraaminopyridine, isophthaloyl chloride, and 1,2,4,5-benzenetetracarboxylic acid dianhydride (A) Acid derivatives added separately: Under an inert atmosphere a solution of 2.03 g. (0.01 mole isophthaloyl chloride in 4 cc. N,N-dimethylacetamide was added with stirring to a mixture of 4.96 g. (0.02 mole) 2,3,5,6-tetraaminopyridine trihydrochloride and 25 cc. anhydrous, deoxygenated N,N-dimethylacetamide at 0° C. After 2 hours at ice temperature, a solution of 2.16 g. (0.01 mole) 1,2,4,5-benzenetetracarboxylic acid dianhydride in 6 cc. of N,N-dimethylacetamide was added. The reaction was allowed to warm up to room temperature and then stirred overnight. Polymer (7.5 g.) was isolated by addition of methanol, filtering, washing, and vacuum drying. The product was soluble in dimethylsulfoxide and methane-sulfonic acid. Analysis calculated for $C_{28}H_{24}N_{10}O_8Cl_2$: C, 48.1; H, 3.4; Cl, 10.2. Found: C, 47.5; H, 3.6; Cl, 9.3.

(B) Acid derivatives added simultaneously: Example 87A was repeated, except that a premixed solution of 0.01 mole each of isophthaloyl chloride and 1,2,4,5-benenetetracarboxylic acid dianhydride in N,N - dimethylacetamide was added to the tetramine salt. The polymer so produced showed minor variations in the infrared spectrum from the polymer in Example 87A. Both polymers upon heating at 250–300° C. gave the corresponding cyclized polymer which exhibited excellent solvent and thermal resistance.

EXAMPLE 88B

Polyquinoxaline from 2,3,5,6-tetraaminopyridine and 4,4′-diglyoxalyldiphenyl ether dihydrate To a solution of 6.36 g. (0.020 mole) of 4,4′-diglyoxalyldiphenyl ether dihydrate dissolved in 125 cc. hexamethylphosphoramide was added 2.78 g. (0.020 mole) 2,3,5,6-tetraaminopyridine dissolved in 75 cc. hexamethylphosphoramide. The phosphoramide solvent was freshly distilled under nitrogen at reduced pressure directly into the reaction vessel. Weighings and additions were carried out under a nitrogen atmosphere in a dry box. After stirring in the dry box for 1 hour at ambient temperature, the reaction flask was heated at 100° C. for 3 hours and then at about 160° C. for 15 hours. The polymer was precipitated by the addition of 800 cc. anhydrous methanol, washed, and vacuum dried. The polymer was post-heated to complete the cyclization to polyquinoxaline structure as follows: the dry polymer was finely ground and placed in a small rotating flask containing several small stainless steel balls and gradually heated to 375° C. while rotating to under high vacuum and then maintained at this temperature (±5° C.) for 2 hours. Analysis of the polymer was consistent with a polyquinoxaline structure.

EXAMPLE 88B

In an alternate procedure for making the above polymer, m-cresol solvent was used as follows: To a 3-necked 100 cc. flask fitted with stirrer, condenser and nitrogen inlet was added 50 cc. m-cresol. The system was purged of air and 1.39 g. (0.010 mole) of 2,3,5,6-tetraaminopyridine added under strong nitrogen sweep. To this slurry at ambient temperature was added 3.18 g. (0.010 mole) 4,4′-diglyoxalyldiphenyl ether dihydrate. After 2 hours at 25–35° C., polymer was precipitated into methanol and redissolved in m-cresol. The polymer solution was heated several hours at 75° C., gradually heated to 200° C., and solvent removed under vacuum. The resulting polymer was heated 2 hours at 300–375° C. under nitrogen to afford the polyquinoxaline.

EXAMPLES 89–97

When the procedure of Example 88B is repeated using each of the following diglyoxal dihydrates or mixtures of bisglyoxals instead of 4,4′-diglyoxalyldiphenyl ether dihydrate, or in part replacing the 2,3,5,6-tetraaminopyridine trihydrochloride, the corresponding polyquinoxalines are obtained.

(89) 1,3-diglyoxalylbenzene
(90) 1,4-diglyoxalylbenzene
(91) bis(4-glyoxalyphenyl) sulfide
(92) bis(4-glyoxalyphenyl) sulfone
(93) 4,4′-diglyoxalyldiphenyl
(94) 4,4′-diglyoxalylbenzophenone
(95) Example 88B except replacing 0.005 mole 2,3,5,6-tetraaminopyridine with 0.005 mole 1,2,4,5-tetraaminobenzene
(96) 1,4-diglyoxalylbenzene (0.005 mole) and bis(4-glyoxalylphenyl) sulfide (0.005 mole)
(97) bis(4-glyoxalylphenyl) ether (0.004 mole), 4,4′-diglyoxalylbenzophenone (0.003 mole), and 4,4′-diglyoxalyldiphenyl (0.003 mole)

EXAMPLES 98–105

When the procedure of Example 88 is repeated using each of the following bisbenzils or mixtures of bisbenzils instead of 4,4′-diglyoxalyldiphenyl ether dihydrate or in part replacing the 2,3,5,6-tetraaminopyridine, the corresponding phenylated polyquinoxalines are obtained.

(98) 1,3-di(phenylglyoxalyl)benzene
(99) 1,4-di(phenylglyoxalyl)benzene
(100) 4,4′-di(phenylglyoxalyl)diphenyl
(101) bis[4-(phenylglyoxalyl)phenyl] ether
(102) bis[4-(phenylglyoxalyl)phenyl] sulfone
(103) 4,4′-di(phenylglyoxalyl)benzophenone
(104) Example 88 except replacing 0.005 mole 2,3,5,6-tetraaminopyridine with 0.005 mole 1,2,4,5-tetraaminobenzene
(105) bis[4 - (phenylglyoxalyl)phenyl] ether (0.005 mole) and 1,4 - di(phenylglyoxalyl)benzene (0.005 mole).

EXAMPLE 106

Polyquinoxaline from 2,3,5,6-tetraaminopyridine and 1,4-diglyoxalylbenzene dihydrate Under an inert atmosphere 1.0 g. (0.004 mole) 2,3,5,6-tetraaminopyridine trihydrochloride was added to a stirred solution of 0.90 g. (0.004 mole) 1,4-diglyoxalylbenzene dihydrate, 0.75 cc. methanesulfonic acid and 9 g. anhydrous, deoxygenated N-methylpyrrolidinone. The reaction was maintained at 0–5° C. for 3 hours, diluted with an equal volume of solvent, 5 cc. triethylamine added, and polymer precipitated by addition of 75 cc. methanol. Upon filtration, washing, an vacuum drying, 1.0 g. of brown solid was obtained. The polymer was soluble in methanesulfonic acid and hexamethylphosphoramide. Analysis calculated for $C_{15}H_{11}N_5O_2$: C, 61.4; H, 3.8; N, 23.9. Found: C, 59.5; H, 4.0; N, 23.2.

This material could be converted to the cyclized polyquinoxaline structure of Example 90 by gradually heating to 375° C. or by heating in polyphosphoric acid at 180° C. Thermally resistant films were obtained from solution after allowing solvent evaporation and heating gradually to 370° C. under an inert atmosphere.

EXAMPLES 107–110

When the procedure of Example 106 is repeated using each of the following tetramine salts instead of 2,3,5,6-tetraaminopyridine trihydrochloride, the corresponding quinoxaline prepolymer and cyclized polyquinoxaline are produced and films of good solvent and chemical resistance are obtained.

(107) 4,4',5,5'-tetraamino-2,2'-bipyridine dihydrochloride
(108) Example 106 except replacing 0.002 mole 2,3,5,6-tetraaminopyridine trihydrochloride with 0.002 mole 4,4',5,5'-tetraamino-2,2'-bipyridine dihydrochloride.
(109) Example 106 except replacing 0.002 mole 2,3,5,6-tetraaminopyridine trihydrochloride with 0.002 mole 3,3',4,4'-tetraaminobenzophenone trihydrochloride.
(110) Example 106 except replacing 0.002 mole 2,3,5,6-tetraaminopyridine trihydrochloride with 0.002 mole 3,3'-diaminobenzidine tetrahydrochloride.

EXAMPLES 111–116

When the procedure of Example 106 is repeated using each of the following bis(α-dicarbonyl) compounds instead of 1,4-diglyoxalylbenzene dihydrate, the corresponding quinoxaline prepolymer and cyclized polyquinoxaline and films of good solvent and chemical resistance are obtained.

(111) 4,4'-diglyoxalyldiphenyl ether dihydrate
(112) bis(4-glyoxalylphenyl) sulfone dihydrate
(113) 4,4'-diglyoxalyldiphenyl dihydrate
(114) 1,4-di(phenylglyoxalyl) benzene
(115) 4,4'-di(phenylglyoxalyl) diphenyl
(116) bis[4-(phenylglyoxalyl)phenyl] ether Related subject matter is disclosed in patent application entitled, "Process for the Preparation of Heterocyclic Polymers from Aromatic Tetramines and Derivatives of Polycarboxylic Acids," filed concurrently herewith.

What is claimed is:
1. Soluble uncyclized polymer consisting essentially of units of the structural formula

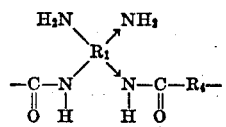

wherein $R_1$ is a tetravalent radical selected from the group consisting of 2,3,5,6-tetrasubstituted pyridyl and 2,2'-bipyridyls, said tetravalent pyridyl radicals being substituted with amine groups in pairs, the members of each pair being on ortho carbon atoms of said tetravalent pyridyl radicals and not more than 2 of said amine groups being present on each of the pyridyl rings in said 2,2'-bipyridyl; $R_4$ represents a divalent organic radical; and the symbol → denotes possible isomerism.

2. Soluble uncyclized polymer consisting essentially of units of the structural formula

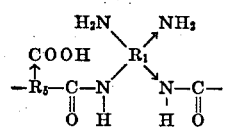

wherein $R_1$ is a tetravalent radical selected from the group consisting of 2,3,5,6-tetrasubstituted pyridyl and 2,2'-bipyridyls, said tetravalent pyridyl radicals being substituted with amine groups in pairs, the members of each pair being on ortho carbon atoms of said tetravalent pyridyl radicals, and not more than 2 of said amine groups being present on each of the pyridyl rings in said 2,2'-bipyridyl; $R_5$ represents a trivalent radical containing at least two carbon atoms, substituted with two carbon atoms being situated 1,2 or 1,3 on carbons of the $R_5$ group and ortho or peri when $R_5$ is aromatic, the third carbon substituent not being in a 1,2 or 1,3 or ortho or peri position to either of the other two carbon substituents; and the symbol → denotes possible isomerism.

3. Soluble uncyclized polymer consisting essentially of units of the structural formula

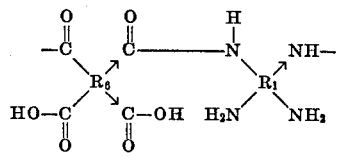

wherein $R_1$ is a tetravalent radical selected from the group consisting of 2,3,5,6 - tetrasubstituted pyridyl and 2,2'-bipyridyls, said tetravalent pyridyl radicals being substituted with amine groups in pairs, the members of each pair being on ortho carbon atoms of said tetravalent pyridyl radicals, and not more than 2 of said amine groups being present on each of the pyridyl rings in said 2,2'-bipyridyl; $R_6$ represents a tetravalent radical containing at least two carbon atoms, substituted with carbon atoms in pairs, the members of each pair being situated 1,2 or 1,3 on carbons of the $R_6$ group, and ortho or peri when $R_6$ is aromatic; and the symbol → denotes possible isomerism.

4. Soluble uncyclized polymer consisting essentially of at least one unit of the structural formulae:

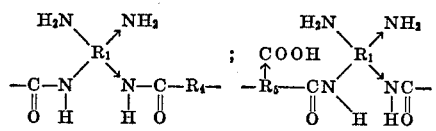

and

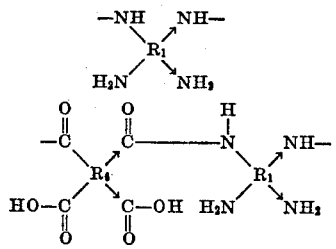

wherein $R_1$ is a tetravalent radical selected from the group consisting of 2,3,5,6-tetrasubstituted pyridyl and 2, 2'-bipyridyls, said tetravalent pyridyl radicals being substituted with amine groups in pairs, the members of each pair being on ortho carbon atoms of said tetravalent pyridyl radicals, and not more than 2 of said amine groups being present on each of the pyridyl rings in said 2,2'-bipyridyl; $R_4$ represents a divalent organic radical; $R_5$ represents a trivalent radical containing at least two carbon atoms, substituted with two carbon atoms being situated 1,2 or 1,3 on carbons of the $R_5$ group and ortho or peri when $R_5$ is aromatic, the third carbon substituent not being in a 1,2 or 1,3 or ortho or peri position to either of the other two carbon substituents; wherein $R_6$ represents a tetravalent radical containing at least two carbon atoms, substituted with carbon atoms in pairs, the members of each pair being situated 1,2 or 1,3 on carbons of the $R_6$ group, and ortho or peri when $R_6$ is aromatic; and the symbol → denotes possible isomerism.

5. Polymer according to claim 4 wherein in the units set forth, at least some of the divalent groups represented by the formula

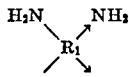

are replaced by —$R_8$— wherein $R_8$ is a divalent radical selected from the group consisting of aromatic carbocyclic divalent radicals in which up to two hydrogens ortho to an amine group are replaced by hydroxyl or mercapto groups with the proviso that no three consecutive adjacent ring positions are substituted by amine, hydroxyl or mercapto groups.

6. The process for the preparation of soluble uncyclized polymer and acid salts thereof which comprises:
reacting (1) at least one acid salt of an aromatic tetramine represented by the formula $R_1(NH_2)_4$ wherein $R_1$ is a tetravalent radical selected from the group consisting of 2,3,5,6 - tetrasubstituted pyridyl and 2,2'-bipyridyls, said tetravalent pyridyl radicals being substituted with amine groups in pairs, the members of each pair being on ortho carbon atoms of said tetravalent pyridyl radicals, and not more than 2 of said amine groups being present on each of the pyridyl rings in said 2,2'-bipyridyl with
(2) at least one carboxylic acid derivative selected from the group consisting of dibasic acid halides, acid chloride anhydrides of a tribasic acid, and dianhydrides,
said reaction being carried out in an aprotic solvent for at least one of said reactants and at a temperature less than about 100° C.; the total moles of acid derivatives being substantially equal to the total moles of tetramine salts.

7. The process of claim 6 wherein the total moles of tetramine salts is greater than the total moles of acid derivatives.

8. Polymer according to claim 4 wherein in the units set forth, at least some of the divalent groups represented by the formula

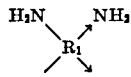

are replaced by

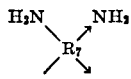

wherein $R_7$ is a tetravalent carbocyclic aromatic radical; each amine group being attached directly to a carbon atom of a ring of said tetravalent radicals ortho to the carbon atom to which another amine group is directly attached, but in no case are three amine groups substituted in consecutive, adjacent positions on the ring; where the total moles of acid derivatives is substantially equal to the total moles of tetramine salts.

9. The cyclodehydration products of claim 4.

10. The process of claim 6 wherein the reaction temperature is between about below 0° C. to about 75° C. and the acid reactant (2) is added to the acid salt of the aromatic tetramine reactant (1).

11. The process of claim 6 wherein the reactants are at least one acid salt of said tetravalent pyridyl compound and at least one dibasic acid halide.

12. The cyclodehydrated products of the polymers of claim 1.

13. The process of claim 6 wherein the reactants are at least one salt of said tetravalent pyridyl compound and at least one acid chloride anhydride derivative of a tribasic acid.

14. The cyclodehydrated products of the polymers of claim 2.

15. The process of claim 6 wherein the reactants are at least one salt of said tetravalent pyridyl compound and at least one dianhydride of a tetrabasic acid.

16. The cyclodehydrated products of the polymers of claim 3.

17. The process of claim 6 wherein the reactants include both at least one acid salt of a tetramine as defined in claim 6 and at least one acid salt of a tetramine represented by the formula $R_7(NH_2)_4$ wherein $R_7$ is a tetravalent radical selected from the group consisting of monocarbocyclic aromatic radicals, biphenyls, and polycarbocyclic aromatic radicals bridged by a radical selected from the group of alkylene of 1 to 3 carbon atoms, oxygen, sulfur, sulfonyl, and carbonyl, each amine group being attached directly to a carbon atom of a ring of said tetravalent radicals ortho to the carbon atom to which another amine group is directly attached, but in no case are three amine groups substituted in consecutive, adjacent positions on the ring; where the total moles of acid derivatives is substantially equal to the total moles of tetramine salts, the reaction conditions being as defined in claim 6.

18. A self supporting film comprising the heterocyclic polymers of claim 9.

19. A fiber comprising the polymer of claim 9.

20. The process of claim 6 wherein at least a portion of the acid salt of an aromatic tetramine represented by the formula $R_1(NH_2)_4$ as defined in claim 6 is replaced by at least one diamine or salt of a diamine represented by the formula $R_8(NH_2)_2$ wherein $R_8$ is a divalent radical selected from the group consisting of monocarbocyclic aromatic radicals, biphenyls, and carbocyclic aromatic radicals bridged by a radical selected from the group of alkylene of 1 to 3 carbon atoms, oxygen, and sulfur and said aromatic radicals being those where up to two hydrogens ortho to an amine group are replaced by hydroxyl or mercapto with the provision that no three consecutive adjacent ring positions are substituted by amine, hydroxyl or mercapto groups; the total moles of amine reactants being at least equal to the total moles of acid reactants.

21. The heterocyclic polymers of claim 9 where the aromatic heterocyclic tetraamino compound consists of both 2,3,5,6-tetraaminopyridine and a tetraaminobipyridine with two amino groups ortho to each other on each ring.

22. The cyclodehydration products of claim 8.

23. The products of claim 22 where $R_7$ is selected from the following tetravalent radicals: 3,3',4,4'-biphenyl, bis (3,4-phenyl) ether, and 3,3'4,4'-benzophenone.

24. The cyclodehydration products of claim 5 when the total moles of amine reactants is substantially equal to the total moles of acid reactants.

25. The polymers and acid salts thereof of claim 5 where the diamine contains at least one hydroxyl or mercapto group ortho to an amine group and the acid derivative is a diacid halide.

References Cited

UNITED STATES PATENTS

| | | | |
|---|---|---|---|
| 2,895,948 | 7/1959 | Brinker et al. | 260—78.4 |
| 3,174,947 | 3/1965 | Marvel et al. | 260—47 |
| 3,313,783 | 4/1967 | Iwakura et al. | 260—78 |
| 3,386,969 | 6/1968 | Levine | 260—78.4 |
| 3,470,140 | 9/1969 | Salle et al. | 260—78 |
| 3,476,590 | 11/1969 | Rabilloud et al. | 117—126 |
| 3,532,673 | 10/1970 | Bell, Jr. et al. | 260—78 |

LESTER L. LEE, Primary Examiner

U.S. Cl. X.R.

260—30.2, 30.6 R, 30.8 R, 30.8 DS, 32.4, 32,6 N, 65, 72.5, 78 TF, 78.4 R, 78.4 E, 246, 250, 294.8 F, 295 S, 295 CA, 295 AM, 296 R, 309.2